United States Patent [19]

Kobayashi et al.

[11] Patent Number: 4,507,059
[45] Date of Patent: Mar. 26, 1985

[54] VARIABLE DELIVERY COMPRESSOR

[75] Inventors: Hisao Kobayashi; Makoto Ohno; Shinichi Suzuki, all of Kariya, Japan

[73] Assignee: Kabushiki Kaisha Toyoda Jidoshokki Seisa-Kusho, Kariya, Japan

[21] Appl. No.: 574,681

[22] Filed: Jan. 27, 1984

[30] Foreign Application Priority Data

Feb. 1, 1983 [JP] Japan ............................. 58-13474[U]

[51] Int. Cl.³ .............................. F04B 1/16; F04B 1/18
[52] U.S. Cl. .................................... 417/270; 417/296; 137/854; 137/856; 251/61.3
[58] Field of Search ............... 417/269, 270; 251/61.3, 251/63.5; 137/512.4, 854, 856

[56] References Cited

U.S. PATENT DOCUMENTS

| 724,641 | 4/1903 | Wiki ...................................... 137/854 |
| 2,106,775 | 1/1938 | Trask .................................... 137/854 |
| 3,998,243 | 12/1976 | Osterkorn ............................ 137/856 |
| 4,283,166 | 8/1981 | Hiraga ................................. 417/269 |
| 4,318,809 | 3/1982 | Bethel ................................. 137/512.4 |
| 4,403,921 | 9/1983 | Kato .................................... 417/297 |

Primary Examiner—William L. Freeh
Attorney, Agent, or Firm—Brooks Haidt Haffner & Delahunty

[57] ABSTRACT

A variable delivery compressor having therein a plurality of compression chambers is adapted for compressing a refrigerant gas of a cooling circuit. The compressor has a first delivery chamber communicating with the compression chambers by way of a fixedly arranged valve and a second delivery chamber communicating with the compression chambers by way of a movably arranged delivery valve. This movable valve is formed to include a base portion, a plurality of reed portions formed to radially extend from the outer circumference of the base portion and arranged to face delivery ports, and at least one protrusion formed to radially extend from the outer circumference of the base portion for suppressing the warp of the base portion.

8 Claims, 11 Drawing Figures

VARIABLE DELIVERY COMPRESSOR

BACKGROUND OF THE INVENTION

1. Field of the Invention

The present invention relates to a variable delivery compressor adapted mainly for use in a vehicular air-conditioning system.

2. Description of the Prior Art

As a vehicular air-conditioning system, there has been conceived a construction in which a compressor is run in an increased delivery state, when the temperature of a passenger's compartment is high as at an initial stage of the operation that a cooling load exerted upon the compressor is higher than the cooling capacity, but is run in a decreased delivery state when the compartment temperature drops to a point where the cooling load becomes lower than the cooling capacity. That variable delivery compressor is a swash plate type variable delivery compressor (as is disclosed in Japanese Patent Laid-Open No. 57-73877), which can alternately switch its delivery between 100% and 50%. Although not shown herein, a spool is axially movably mounted in the bore of a rear housing so that a delivery valve is pressed onto a valve plate by opening a first control valve to apply a delivery pressure to the back of the spool whereby the compression at the rear side is effective to perform a run of 100%, and so that the delivery valve is kept apart from the valve plate by closing the first control valve and opening a second control valve to apply a suction pressure to the back of the aforementioned spool whereby the compression at the rear side is made ineffective to switch the run to 50%.

As shown in FIG. 9 herein, the compressor described in the above has its delivery valve 57 constructed of a base portion 57a and reed portions 57b. When the delivery valve 57 slightly leaves a valve plate 4 in the decreased delivery state, as shown in FIG. 10, a refrigerant gas of a delivery chamber 20 flows into a shaft bore 4a (i.e., the suction system) so that the base portion 57a and the reed portions 57b are sucked toward the valve plate 4 until their leading ends strike eventually the valve plate 4. These strikes roughen the surface of the valve plate 4 such that shortage of sealing occurs sensing a drop in the volumetric efficiency in the run of 100% capacity in which the base portion 57a is intended to shut off the shaft bore 4a, as shown in FIG. 11. Especially in the case whether spool 44 vibrates in the axial direction when the aforementioned delivery valve 57 is attracted, the strikes become particularly intense so as to increase the wear of the valve plate 4 thereby to reduce the sealing efficiency.

SUMMARY OF THE INVENTION

It is, therefore, an object of the present invention to provide a variable delivery compressor which is capable of eliminating any incomplete sealing between its delivery chamber and suction system in the run of its cooling capacity at 100%, thereby to improve the volumetric efficiency and the durability of its delivery valve.

The present invention provides a variable delivery compressor which has its delivery valve made liable to warp at its protrusions so that the shocks caused when the protrusions impinge upon a valve plate can be softened.

The present invention also provides a variable delivery compressor which allows the leading ends of the protrusions of the delivery valve to impinge upon the valve plate in a face-to-face relationship thereby to reduce the wear on the same protrusions.

BRIEF DESCRIPTION OF THE DRAWINGS

Other objects, features and advantages of the present invention will become apparent from the following detailed description and the accompanying drawings, in which.

DESCRIPTION OF THE PREFERRED EMBODIMENTS

Figure 1:
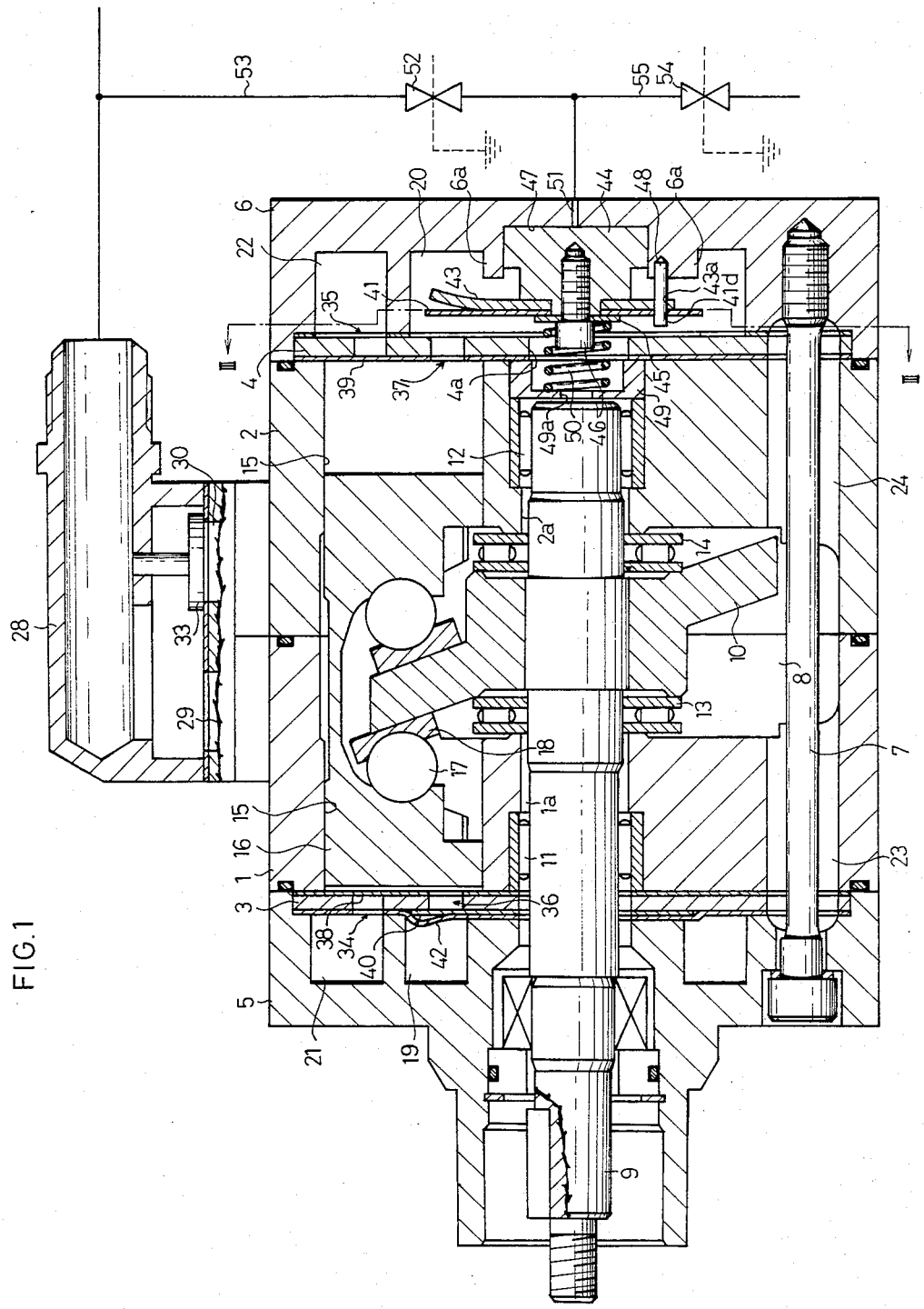
FIG. 1 is a longitudinal section showing a swash plate type compressor according to one embodiment of the present invention when it is in a decreased delivery state.

The present invention will be described in the following in connection with one embodiment, in which it is embodied as a swash plate type variable delivery compressor of a vehicular air-conditioning system, with reference to FIGS. 1 to 7. The front and rear ends of cylinder blocks 1 and 2 are respectively closed by front and rear housings 5 and 6 through valve plates 3 and 4, respectively. The two cylinder blocks 1 and 2, the two housings 5 and 6 and the two valve plates 3 and 4 are connected together by an appropriate number of bolts 7. At the connection portion of the cylinder blocks 1 and 2, there is formed a swash plate chamber 8 in which a swash plate 10 secured to a drive shaft 9 is received. The drive shaft 9 extends axially through shaft bores 1a and 2a which are bored through the centers of the two connected cylinder blocks 1 and 2. In the shaft bores 1a and 2a of the cylinder blocks 1 and 2, respectively, there are press-fitted radial bearings 11 and 12 for rotatably supporting the aforementioned drive shaft 9. Moreover, thrust bearings 13 and 14 are sandwiched between the cylinder blocks 1 and 2 and the swash plate 10. Each of the cylinder blocks 1 and 2 is formed with five cylinder bores 15 extending in parallel with the drive shaft 9 and arranged at five radial positions around the drive shaft 9. Pistons 16 fitted in those cylinder bores 15 are engaged with the swash plate 10 through bearing members composed of balls 17 and shoes 18. Due to these engagements, the rotation of the swash plate 10 causes reciprocal sliding movements of the pistons 16 within the cylinder bores 15.

Within the front and rear housings 5 and 6, there are formed delivery chambers 19 and 20, which are arranged in the central portions of the housings 5 and 6, respectively, and substantially annular suction chambers 21 and 22 which are arranged to encircle the respective delivery chambers 19 and 20. Of these, the delivery chamber 19 formed at the front side has an annular shape, whereas the delivery chamber 20 has a generally circular shape, as better seen in FIG. 3. The suction chambers 21 and 22 are connected with the swash plate chamber 8 by way of suction passages 23 and 24 which can also act as through-holes through which the aforementioned bolts 7 axially extend. The swash plate chamber 8 per se is fluidly connected to a suction flange 25 which is attached in the vicinity of the connecting portion of the cylinder blocks 1 and 2.

Figure 3:
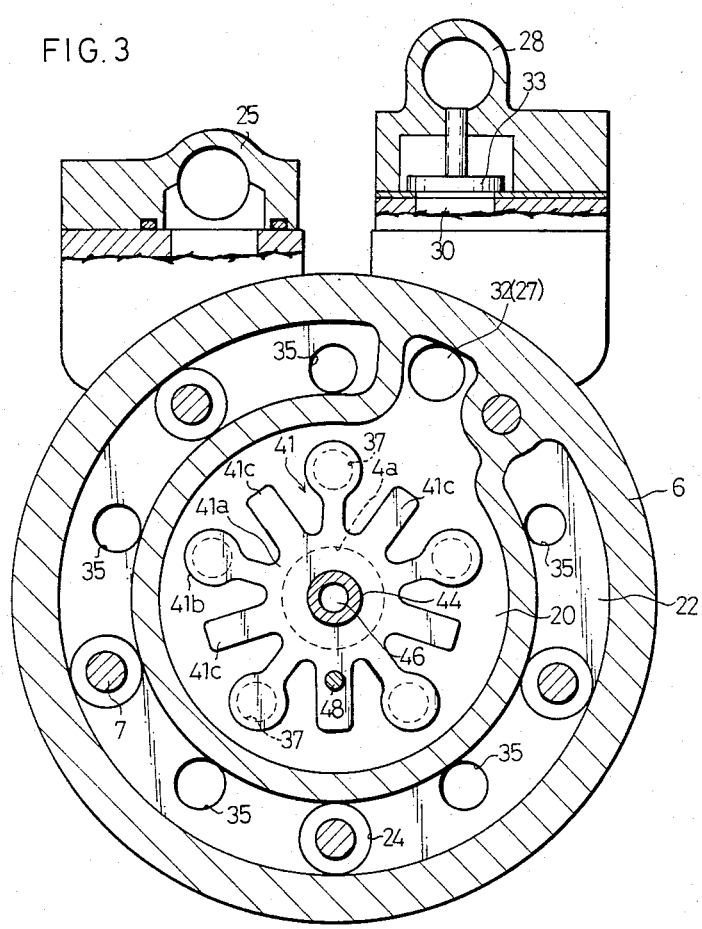
FIG. 3 is a section taken along line III—III of FIG. 1.
Figure 4:
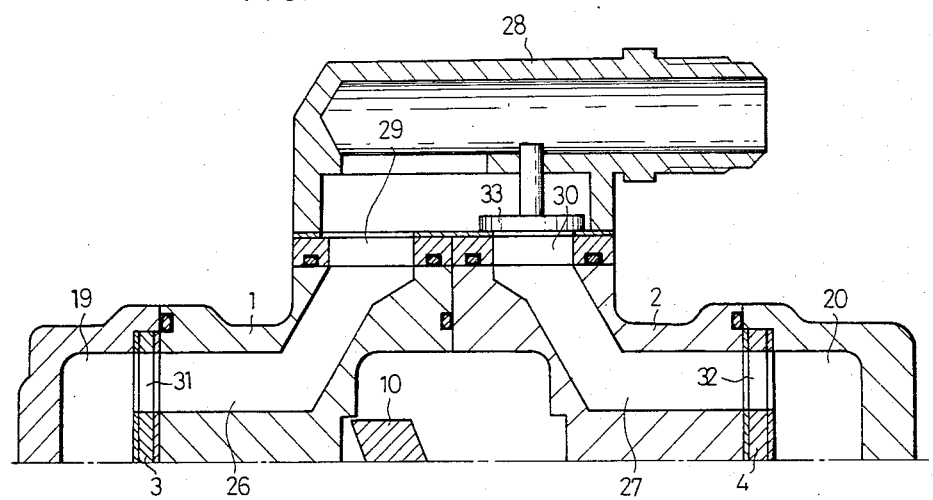
FIG. 4 is also a longitudinal section but shows only the neighborhood of the delivery passages of the compressor of FIGS. 1 and 2.

As shown in FIG. 4, delivery passages 26 and 27 are formed in the cylinder blocks 1 and 2. The delivery passage 26 extends from that surface of the cylinder block 1 which contacts the valve plate 3, to the connecting portion of the cylinder blocks 1 and 2, whereas the delivery passage 27 extends from the contacting surface of the cylinder block 2 with the valve plate 4 to the connecting portion of the cylinder blocks 1 and 2. These two delivery passages 26 and 27 are respectively and fluidly connected to a delivery flange 28, which is attached in the vicinity of the connecting portion of the two cylinder blocks 1 and 2, by way of connecting passages 29 and 30. The delivery passages 26 and 27 are fluidly connected at their other ends to the delivery chambers 19 and 20, respectively, by way of connecting bores 31 and 32 which are formed in the valve plates 3 and 4, respectively. It should be understood that the delivery chambers 19 and 20 have outwardly extended portions, respectively, at which they are fluidly connected to the delivery passages 26 and 27 (as better seen from FIG. 3). Moreover, the connecting passage 30 is equipped with a check valve 33 which is set to close the connecting passage 30 when the delivery chamber 20 at the rear side is kept under a low pressure condition and to open the passage 30 when the delivery chamber 20 is kept under a high pressure condition.

The front and rear valve plates 3 and 4 are respectively bored with suction ports 34 and 35 for connecting the cylinder bores 15 and the suction chambers 21 and 22, respectively, and delivery ports 36 and 37 for connecting the cylinder bores 15 and the delivery chambers 19 and 20, respectively. The suction ports 34 and 35 are provided with suction valves 38 and 39, respectively, and the delivery ports 36 and 37 are provided with delivery valves 40 and 41, respectively. The delivery valves 40 and 41 are made deformable, but their deforming amounts are restricted within respective given limits by valve guards 42 and 43, respectively. The front delivery valve 40 together with the valve guard 42 is fixedly attached to the valve plate 3. On the other hand, the rear delivery valve 41 together with the valve guard 43 is movable between a normal closed position where the valve 41 closes the delivery ports 37 and an open position where the valve 41 opens the delivery ports 37.

Figure 5:
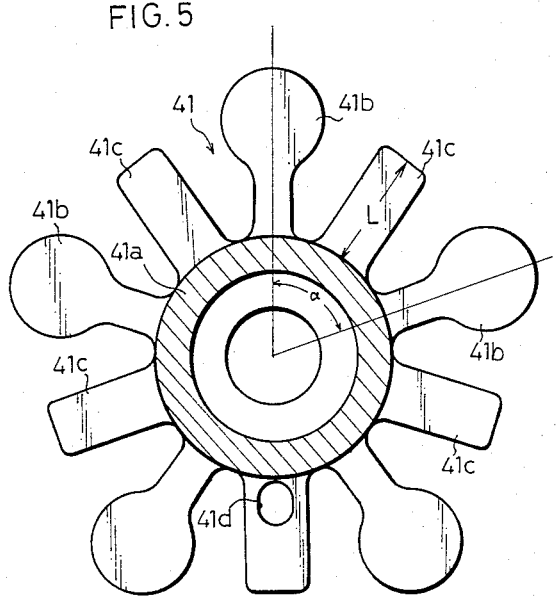
FIG. 5 is an enlarged front elevation showing only a delivery valve.

More specifically, the delivery valve 41 and the valve guard 43 are fixed to a cylindrical spool 44 by means of a bolt 46 and a washer 45 so that the valve 41, the valve guard 43 and the spool 44 are arranged to be concentric with one another. The spool 44 is axially slidably received in a circular recess 47 which is defined by an inwardly projecting wall 6a of the rear housing 6. The aforementioned delivery valve 41 is composed of, as shown in FIGS. 3 and 5, an annular base portion 41a, a plurality of (e.g., five in the present embodiment) reed portions 41b radially extending at a forming angle α to face the respective delivery ports 37, and a plurality of (e.g., five in the present embodiment) protrusions 41c radially extending between any two adjoining reed portions 41b and constituting the feature of the present invention. In other words, all the reed portions 41b and the protrusions 41c are made integral with the base portion 41a of the delivery valve 41 in a manner to outwardly project in radial direction. Each of the protrusions 41c has a generally rectangular front shape having a relatively large length L. On the other hand, the aforementioned valve guard 43 is formed to have the same shape as that of the delivery valve 41 except the aforementioned protrusions 41c.

It should also be understood that the four members assembled by means of the bolt 46 are prevented from any rotation by a positioning pin 48 which is anchored in the wall 6a of the rear housing 6. In order to insert the positioning pin 48, one of the protrusions 41c of the delivery valve 41 and the valve guard 43 are formed with holes 41d and 43a, respectively.

The shaft bore 2a formed in the center of the rear cylinder block 2 is fluidly connected to the central portion of the delivery chamber 20 by way of a shaft bore 4a which is formed through the central portion of the valve plate 4. In the rear end portion of the shaft bore 2a, there is fitted a cylindrical spring holder 49 in which there is received a spring 50 for urging the delivery valve 41 at all times toward its open position. The spring holder 49 is formed, in its bottom, with a through-hole 49a through which the delivery chamber 20 communicates with the swash plate chamber 8 in the state wherein the delivery valve 41 is kept in its open position. However, this communication is blocked to keep the seal therebetween when the delivery valve 41 is moved to the normal closed position to bring its annular base portion 41a (i.e., the hatched portion appearing in FIG. 5) into contact with the valve plate 4.

The rear housing 6 is formed, at its central portion, with a pressure inlet hole 51 for introducing a pressure onto the back of the spool 44. The pressure inlet hole 51 communicates with the delivery flange 28 by means of a high pressure conduit 53 having therein a first electromagnetic valve 52, and with the suction flange 25 by means of a low pressure conduit 55 having therein a second electro-magnetic valve 54. It should be noted here that the opening and closing controls of the first and second electro-magnetic valves 52 and 54 are conducted by the action of a pressure switch (although not shown) which is arranged in a part of the air-conditioning system such that they can be operated in response to a change in the temperature of the vehicular compartment.

The operation of the variable delivery compressor having the construction thus far described will now be explained hereinafter.

While the compressor is stopped, the rear delivery valve 41 is moved by the action of the spring 50 to its open position, and the check valve 33 closes the connecting passage 30, as shown in FIG. 1. Moreover, the first electro-magnetic valve 52 is opened, and the second electro-magnetic valve 54 is closed.

When the compressor is driven in this state, the front side of the compressor immediately starts its normal compressing operation. Since the rear delivery valve 37 is opened, however, the refrigerant gas merely flows in a free and reciprocal manner between the respective cylinder bores 15 and the delivery chamber 20. Since the delivery chamber 20 and the swash plate chamber 8 are short-circuited via the by-pass aperture provided by the the shaft bores 2a and 4a, moreover, the rear side of the compressor performs no compressing operation and idles. Thus, at the start of the operation, the compressor exerts only 50% of its full compression.

Figure 2:
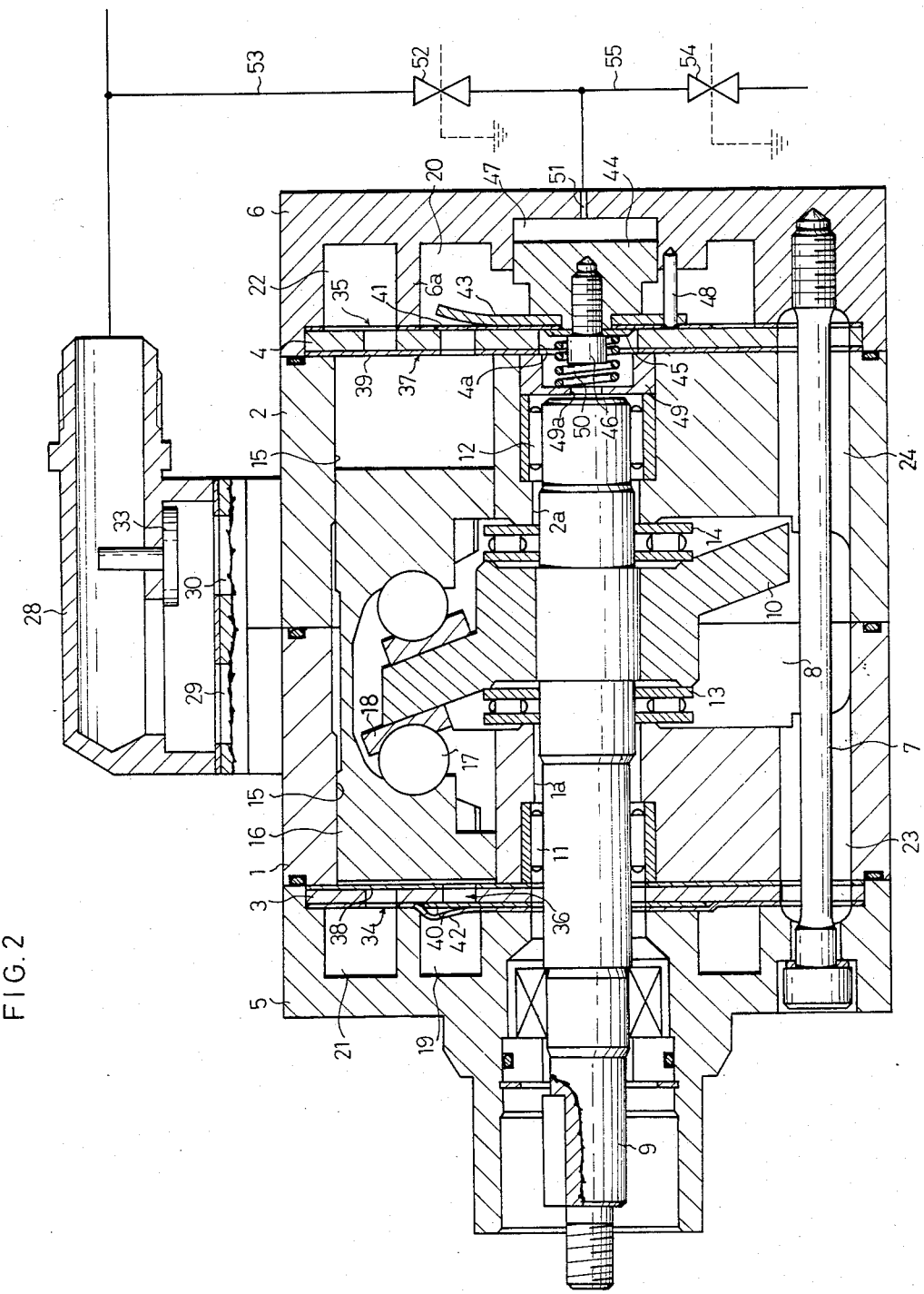
FIG. 2 is also a longitudinal section showing the swash plate type compressor of FIG. 1 but in an increased delivery state.

When the delivery pressure is applied by the normal compressing operation of the front side of the compressor to the back of the spool 44 through the high pressure conduit 53 (At this stage, the first electro-magnetic valve 52 is kept in its open state whereas the second electro-magnetic valve 54 is kept in its closed state), the rear delivery valve 41 is urged against the action of the spring 50 toward its closed position, in which the valve 41 is pressed against the rear valve plate 4, to close the respective delivery ports 37 of the cylinder bores 15 and the shaft bores 2a and 4a. Accordingly, the rear side of the compressor also commences its normal compressing operation. Consequently, the check valve 33 is pressed toward its open position by the compressed gas delivered from the rear side of the compressor. As a result, the connecting passage 30 is opened so that the compressor is run to exert its entire compression performance of 100% (as shown in FIG. 2).

Next, the steady state operation of the compressor will be explained in the following. Under a high load, i.e., when the cooling load is high, the compressor is run in the cooling capacity of 100%.

When the cooling load applied to the air-conditioning system is reduced, namely, when the inside of the vehicular compartment is cooled to reduce the suction pressure, a pressure switch (although not shown) is turned on to close the first electro-magnetic valve 52 and open the second electro-magnetic valve 54. As a result, a low suction pressure acts upon the back of the spool 44 so that the rear delivery valve 41 is moved by the action of the spring 50 apart from the valve plate 4. Thus, the rear delivery port 37 is opened. Accordingly, the compressing operation of the rear side of the compressor becomes ineffective as at the aforementioned state. That is, the operation of the compressor is switched to the state where the compressor exerts 50% of its full compression performance. At this state, the check valve 33 is urged to its closed position by the delivery pressure delivered from the front side of the compressor. As a result, the connecting passage 30 is closed to prevent the compressed delivery gas from leaking from the front side to the rear side.

In the aforementioned decreased capacity state from the performance of 100% to the performance of 50%, the delivery valve 41 is brought away from the valve plate 4, as has been described hereinbefore. At this stage, the high pressure gas flows from the delivery chamber 20 into the shaft bore 4a of the valve plate 4 to urge the delivery valve 41 toward the valve plate 4. At this stage, moreover, since the base portion 41a of the delivery valve 41 has its inner circumference restricted by the washer 45, it is deformed from its outer circumference. Since the protrusions 41c are formed to integrally extend from the outer circumference of the base portion 41a, however, their leading ends first impinge upon the valve plate 4. It should be appreciated that the following three advantages can be obtained partly because the length L of those protrusions 41c continues to have a sufficient value, as better seen from FIGS. 5 and 6, and partly because the angle $\theta$ of the protrusions 41c with respect to the valve plate 4 upon the impingement is small:

(1) The protrusions 41c can warp so that the shocks due to the impingement can be absorbed. This shock absorbing effect is prominent especially in case the spool 44 axially vibrates while it is being moved. At this stage, the reed portions 41b also warp. Of these, the reed portions 41b during the delivery (i.e., the reed portions 41b in half of the number of the cylinders) can be prevented from impinging upon the valve plate 4. Moreover, no serious problem arises regarding wear around the delivery ports 37 because of an action which is similar to that described in the following advantage (2).

Figure 7:
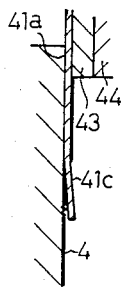
FIG. 7 is also an enlarged partial and sectional view for the same purpose when in the increased delivery state.

(2) The impingement of the leading ends of the protrusions 41c is effected in a face-to-face relationship so that wear can be reduced. Even if wear is caused, as shown in FIG. 7, moreover, the surface of the valve plate 4 facing the base portion 41a is not roughened so that the sealing efficiency of the base portion 41a is not deteriorated.

(3) Since the warp of the base portion 41a of the delivery valve 41 is small, the durability of the valve 41 can be improved.

Figure 6:
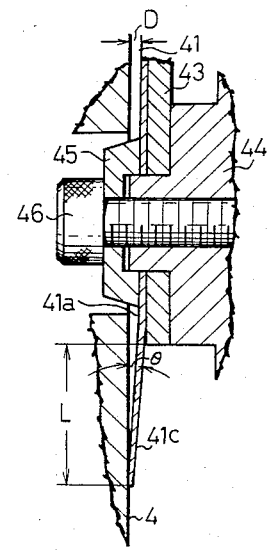
FIG. 6 is an enlarged partial and sectional view for illustrating the operations of the delivery valve of FIG. 5 in the decreased delivery state.

It should be noted that the present invention can also be practised by the following embodiments:

(A) It is desirable that the length L of the protrusions 41c of the delivery valve 41 be two or more times as large as the maximum floating distance D of the delivery valve 41, as better seen from FIG. 6.

(B) It is also desirable that the protrusions 41c be provided, as shown in FIG. 5, where the forming angle $\alpha$ is 60 degrees or more.

Figure 8:
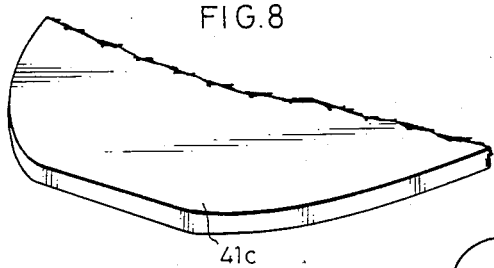
FIG. 8 is a partial and perspective view showing another example of one of protrusions formed with the delivery valve.
Figure 9:
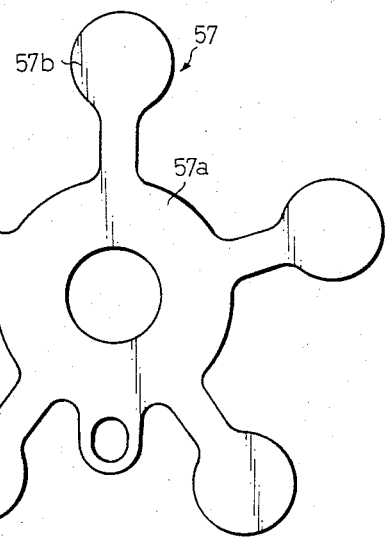
FIG. 9 is a front elevation showing the delivery valve of the prior art.
Figure 10:
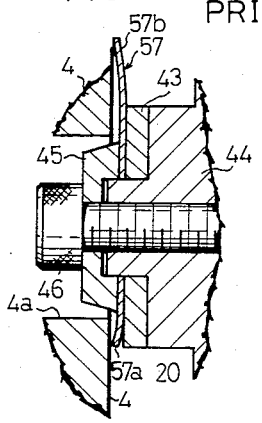
FIG. 10 is a partial and sectional view showing a compressor using the delivery valve of the prior art when in the decreased delivery state.
Figure 11:
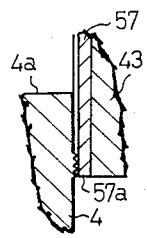
FIG. 11 is also a partial and sectional view showing the compressor of FIG. 10 in the increased delivery state.

(C) As shown in FIG. 8, the leading ends of the protrusions 41c or the reed portions 41b are made straight.

(D) The present invention can be applied not only to the aforementioned swash plate type compressor but also to a variable delivery compressor of the crank or waffle type.

As has been described in detail hereinbefore, according to the present invention, since the delivery valve is formed with not only reed portions but also protrusions protruding from the base portion thereof, the incomplete sealing beteen the delivery chamber and the suction system during the entire capacity run of the compressor can be eliminated to improve the volumetric efficiency and the durability of the delivery valve.

Although the present invention has been described by way of example only with reference to the preferred embodiments thereof, it is to be understood that variations or modifications may be easily made by anybody of ordinary skill in the art without departing from the scope of the invention which is defined by the appended claims.

What is claimed is:

1. A variable delivery compressor for compressing a refrigerant gas of a cooling circuit, comprising:
   a cylinder block means having therein a plurality of compression chambers;
   housing means having therein a plurality of delivery chambers;

valve plate means interposed between said cylinder block means and said housing means, said valve plate means comprising a plurality of valve plates each having therein a plurality of delivery ports and a suction by-pass aperture providing fluid communications between said compression chambers and said delivery chambers;

delivery valve means comprising a plurality of delivery valves each for opening and closing the delivery ports of one of said valve means, at least one of said delivery valves being movable between a normal closed position, in which it is in contact with the corresponding one of said valve plates to close said delivery ports and said suction by-pass aperture thereof, and an open position, in which it is apart from said valve plate, and being formed with a base portion for effecting said closing of said suction by-pass aperture;

passage means for providing a fluid communication between said delivery chambers and the delivery outlet of said variable delivery compressor; and check valve means disposed in said passage means for opening the same in response to the movement of said movable delivery valve to said normal closed position, wherein the improvement resides in that said movable delivery valve includes: a flexible base portion having annular shape whose outer circumference is larger than said suction by-pass aperture; a plurality of reed portions formed to radially extend from said outer circumference of said base portion and arranged to face the respective of said delivery ports, and a corresponding plurality of protrusions formed to radially extend from said outer circumference of said base portion respectively between each adjacent pair of said reed portions for suppressing the warp of said outer circumference of said base portion when said movable delivery valve is in said open position during operation of said compressor.

2. A variable delivery compressor as set forth in claim 1, wherein each said protrusion is interposed between adjacent reed portions which extend at an angle of 60 degrees or larger with respect to each other.

3. A variable delivery compressor as set forth in claim 2, wherein each said protrusion has a leading end formed in a straight shape.

4. A variable delivery compressor as set forth in claim 3, wherein each said protrusion has a generally rectangular shape.

5. A variable delivery compressor as set forth in claim 3, wherein each said protrusion has a length two times or more as large as the distance of movement of said movable delivery valve between its said open and closed positions.

6. A variable delivery compressor as set forth in claim 1, wherein each said protrusion has a leading end formed in a straight shape.

7. A variable delivery compressor as set forth in claim 6, wherein each said protrusion has a generally rectangular shape.

8. A variable delivery compressor as set forth in claim 6, wherein each said protrusion has a length two times or more as large as the distance of movement of said movable delivery valve between its said open and closed positions.

* * * * *